(12) United States Patent
Yan et al.

(10) Patent No.: US 10,262,230 B1
(45) Date of Patent: *Apr. 16, 2019

(54) OBJECT DETECTION AND IDENTIFICATION

(71) Applicant: Amazon Technologies, Inc., Seattle, WA (US)

(72) Inventors: Renwei Yan, Sunnyvale, CA (US); Samuel Henry Chang, San Jose, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/055,310

(22) Filed: Feb. 26, 2016

Related U.S. Application Data

(63) Continuation of application No. 13/594,245, filed on Aug. 24, 2012, now Pat. No. 9,275,302.

(51) Int. Cl.
  *G06K 9/62* (2006.01)
  *G06K 9/00* (2006.01)
  *G06T 19/00* (2011.01)

(52) U.S. Cl.
  CPC ....... *G06K 9/6204* (2013.01); *G06K 9/00208* (2013.01); *G06T 19/006* (2013.01)

(58) Field of Classification Search
  CPC .............. G06K 9/6204; G06K 9/6206; G06K 9/00201; G06K 9/00208; G06K 9/00624; G06K 9/00758; G06K 9/46; G06K 9/4604; G06K 9/4609; G06K 9/48; G06K 9/482; G06T 19/006
  See application file for complete search history.

(56) References Cited

U.S. PATENT DOCUMENTS 5,499,330 A * 3/1996 Lucas ................... G06F 3/0483
                                                        707/E17.008
6,167,155 A * 12/2000 Kostrzewski ........... G06T 9/001
                                                        348/699

(Continued)

FOREIGN PATENT DOCUMENTS

WO   WO2011088053 A2   7/2011

OTHER PUBLICATIONS

Office Action for U.S. Appl. No. 13/594,245, dated May 7, 2015, Renwei Yan, "Object Detection and Identification", 10 pages.

(Continued)

*Primary Examiner* — Manav Seth
(74) *Attorney, Agent, or Firm* — Lee & Hayes, P.C.

(57) ABSTRACT

A two-dimensional (2D) image and a three-dimensional (3D) of an environment may be captured. Upon identifying a location and/or contour of an object from the 3D image, the object from the 3D image may be mapped onto the 2D image. The object, including its location and contour, may be identified from the 2D image. Based at least partly on a comparison between the object from the 3D image and the object from the 2D image, a disparity may be calculated. The location and contour of the object may be determined when it is determined that the disparity is less than or equal to a predetermined threshold. Otherwise, the object from the 3D image may be remapped onto the 2D image.

20 Claims, 5 Drawing Sheets

(56) References Cited

U.S. PATENT DOCUMENTS

| | | | | |
|---|---|---|---|---|
| 6,268,923 B1* | 7/2001 | Michniewicz | G01B 11/2441 | 356/512 |
| 6,434,277 B1* | 8/2002 | Yamada | G06T 11/60 | 345/419 |
| 6,529,206 B1* | 3/2003 | Ohki | G06T 15/20 | 345/427 |
| 6,801,654 B2* | 10/2004 | Nakamura | G06T 15/20 | 345/427 |
| 6,937,348 B2* | 8/2005 | Geng | G01B 11/2509 | 356/602 |
| 7,068,835 B1* | 6/2006 | Ban | G06K 9/522 | 382/154 |
| 7,418,392 B1 | 8/2008 | Mozer et al. | | |
| 7,450,749 B2* | 11/2008 | Rouet | G06T 19/003 | 382/128 |
| 7,499,048 B2* | 3/2009 | Sieracki | A61B 5/00 | 345/156 |
| 7,526,121 B2* | 4/2009 | Ban | G01B 11/25 | 382/154 |
| 7,587,082 B1* | 9/2009 | Rudin | G06K 9/00208 | 345/419 |
| 7,720,683 B1 | 5/2010 | Vermeulen et al. | | |
| 7,774,204 B2 | 8/2010 | Mozer et al. | | |
| 7,796,791 B2* | 9/2010 | Tsougarakis | A61F 2/30756 | 382/128 |
| 7,840,031 B2* | 11/2010 | Albertson | A63B 24/0003 | 382/103 |
| 7,860,282 B2* | 12/2010 | Boese | A61B 90/36 | 382/128 |
| 7,894,649 B2* | 2/2011 | Fu | A61N 5/1049 | 378/65 |
| 8,055,046 B2* | 11/2011 | Feilkas | G06T 7/50 | 345/420 |
| 8,111,908 B2* | 2/2012 | Sim | G06K 9/00208 | 345/421 |
| 8,126,249 B2* | 2/2012 | Brett | G06K 9/6209 | 382/132 |
| 8,179,393 B2* | 5/2012 | Minear | G06T 7/30 | 345/419 |
| 8,253,802 B1* | 8/2012 | Anderson | G06T 7/149 | 348/169 |
| 8,306,265 B2* | 11/2012 | Fry | A61B 5/0452 | 348/143 |
| 8,345,927 B2* | 1/2013 | Ishikawa | G06K 9/48 | 345/629 |
| 8,396,329 B2* | 3/2013 | Brooksby | G01N 21/9515 | 382/151 |
| 8,422,777 B2* | 4/2013 | Aller | G06K 9/3216 | 382/165 |
| 8,428,315 B2* | 4/2013 | Suetens | G06T 19/20 | 382/128 |
| 8,463,004 B2* | 6/2013 | Tuma | A61B 5/064 | 382/128 |
| 8,553,942 B2* | 10/2013 | Lynch | G01C 3/00 | 382/106 |
| 8,577,092 B2* | 11/2013 | Kim | G06K 9/00221 | 382/115 |
| 8,643,701 B2* | 2/2014 | Nguyen | H04N 13/025 | 348/47 |
| 8,662,676 B1* | 3/2014 | Chang | H04N 17/002 | 345/158 |
| 8,686,943 B1* | 4/2014 | Rafii | G06F 3/017 | 345/158 |
| 8,781,217 B2* | 7/2014 | Gurman | G06K 9/00201 | 345/419 |
| 8,787,663 B2* | 7/2014 | Litvak | G06K 9/00375 | 382/165 |
| 8,837,778 B1* | 9/2014 | Chang | G06T 7/251 | 382/103 |
| 8,913,037 B1* | 12/2014 | Liu | G06F 3/017 | 345/175 |
| 8,970,479 B1* | 3/2015 | Chang | G06K 9/00355 | 345/156 |
| 8,970,693 B1* | 3/2015 | Chang | G06T 19/006 | 348/136 |
| 9,058,661 B2* | 6/2015 | Haker | G06K 9/00355 | |
| 9,158,375 B2* | 10/2015 | Maizels | G06T 19/006 | |
| 9,201,501 B2* | 12/2015 | Maizels | G06F 3/011 | |
| 9,275,302 B1* | 3/2016 | Yan | G06K 9/00201 | |
| 9,377,863 B2* | 6/2016 | Bychkov | G06F 3/017 | |
| 9,501,716 B2* | 11/2016 | Fleishman | G06K 9/00375 | |
| 9,654,765 B2* | 5/2017 | Nguyen | H04N 13/04 | |
| 9,767,596 B2* | 9/2017 | Jung | G06T 15/005 | |
| 9,772,405 B2* | 9/2017 | Mundhenk | G01S 17/89 | |
| 9,807,369 B2* | 10/2017 | Usuda | H04N 13/0239 | |
| 2005/0094879 A1* | 5/2005 | Harville | G06K 9/00201 | 382/209 |
| 2006/0140446 A1* | 6/2006 | Luo | G06K 9/00362 | 382/104 |
| 2006/0140473 A1* | 6/2006 | Brooksby | G01N 21/9515 | 382/154 |
| 2009/0110294 A1* | 4/2009 | Frielinghaus | G06K 9/6206 | 382/209 |
| 2009/0183125 A1* | 7/2009 | Magal | G06F 3/017 | 715/863 |
| 2009/0244309 A1* | 10/2009 | Maison | G06K 9/00369 | 348/222.1 |
| 2010/0302395 A1* | 12/2010 | Mathe | G06K 9/00342 | 348/222.1 |
| 2010/0309292 A1* | 12/2010 | Ho | H04N 13/026 | 348/47 |
| 2011/0052006 A1* | 3/2011 | Gurman | G06K 9/00201 | 382/103 |
| 2011/0193939 A1* | 8/2011 | Vassigh | G06F 3/011 | 348/46 |
| 2011/0211045 A1* | 9/2011 | Bollano | G06T 15/20 | 348/46 |
| 2011/0237324 A1* | 9/2011 | Clavin | G06K 9/00369 | 463/29 |
| 2011/0292036 A1* | 12/2011 | Sali | G06T 13/40 | 345/419 |
| 2012/0223885 A1 | 9/2012 | Perez | | |

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

OBJECT DETECTION AND IDENTIFICATION

CROSS-REFERENCE TO RELATED APPLICATIONS

This application is a continuation of, and claims priority to, co-pending, commonly-owned U.S. patent application Ser. No. 13/594,245, entitled "Object Detection and Identification", filed on Aug. 24, 2012, which is incorporated herein in its entirety by reference.

BACKGROUND

Cameras and other types of sensing devices (e.g., microphones) are able to monitor an environment by capturing still images, video images, and audio of the environment. Increasingly, however, it is desired to detect and monitor the physical positions and movements of objects, including users, within an environment. Three-dimensional (3D) cameras may capture a 3D depth map of the environment, which may allow a system to attempt to determine the location and movement of objects within the environment. Yet, due to noise and/or interference associated with the 3D depth map, the outline or contour of the objects present within the environment may appear to be broken or incomplete. As a result, it may be difficult to determine location points that correspond to where objects begin and where those objects end. Therefore, detecting the location and movement of objects within the environment may prove to be inaccurate and time-consuming.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes systems and processes for detecting an object within an environment and detecting the contour (e.g., outline, boundaries, etc.) of that object utilizing both a two-dimensional (2D) image and a three-dimensional (3D) image. More particularly, one or more augmented reality functional nodes ("ARFNs") may determine a physical location of the object within the environment, including any movement associated with the object. In some instances, the object comprises a display medium onto which content may be projected. In these instances, upon determining the contour of the object (i.e., the display medium), a projector of the ARFN may project content onto to the display medium at the determined location and using the information regarding the contour of the display medium.

In various embodiments, a database may store or maintain objects that may be present within an environment (e.g., known objects), including an identity of the objects and a size and shape of the objects. As a result, the system(s) described herein may be aware of users and other objects that may be present within the environment. Moreover, a 2D capture device (e.g., camera) and a 3D capture device may capture a 2D image and a 3D image, respectively, of the environment. Then, based at least in part on the known objects, at least one object may be identified in the 3D image. In addition, the contour (e.g., outline, shape, boundaries, etc.) of the object identified in the 3D image ("3D object") may be determined.

The 3D object may then be mapped to a corresponding location in the 2D image, thus causing the 3D object to at least partially overlap the object in the corresponding 2D image ("2D object"). The 2D object and a contour associated therewith may be determined based at least in part on the 2D image. Subsequently, the predicted locations and contours of the object from both the 2D image and the 3D image may be compared to determine the disparity of the object with respect to the corresponding 2D and 3D images. If it is determined that the disparity is less than or equal to a predetermined threshold, the ARFN may determine that the location and contour of the object has been accurately obtained. The ARFN may then track the object and/or output or project content onto the object according to the determined location and contour of the object.

However, if it is instead determined that the disparity is the same or is greater than the predetermined threshold, the ARFN may repeat the process set forth above and remap the 3D object onto the 2D image. In certain embodiments, the ARFN may estimate or adjust points corresponding to the location and contour of the object. Moreover, the initially predicted shape of the object and previous location information associated with the object may be utilized to map the 3D object onto the 2D image. This process may be repeated until the disparity between the 2D object and the 3D object is equal to or less than the predetermined threshold, which indicates an sufficiently accurate location and contour of the object.

As stated above, deriving the location and contour of an object within an environment exclusively from a 3D camera and a 3D image may cause the determined contour of the object to be inaccurate or incomplete. As a result, the ARFN may determine the location and contour of the object using both a 2D image and a 3D image, despite any noise or interference that is associated with the 3D image. That is, the 2D image may be utilized to more accurately obtain the location, contour, and movement of the object within the environment. Furthermore, in example embodiments, various types of cameras and sensors may be used to capture the 2D and/or 3D images representing the environment and objects within the environment. In some instances, the described techniques may utilize the structured light techniques described below. Of course, other implementations may utilize any other type of depth-sensing (e.g., time-of-flight ToF) and/or image recognition techniques.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

Figure 1:
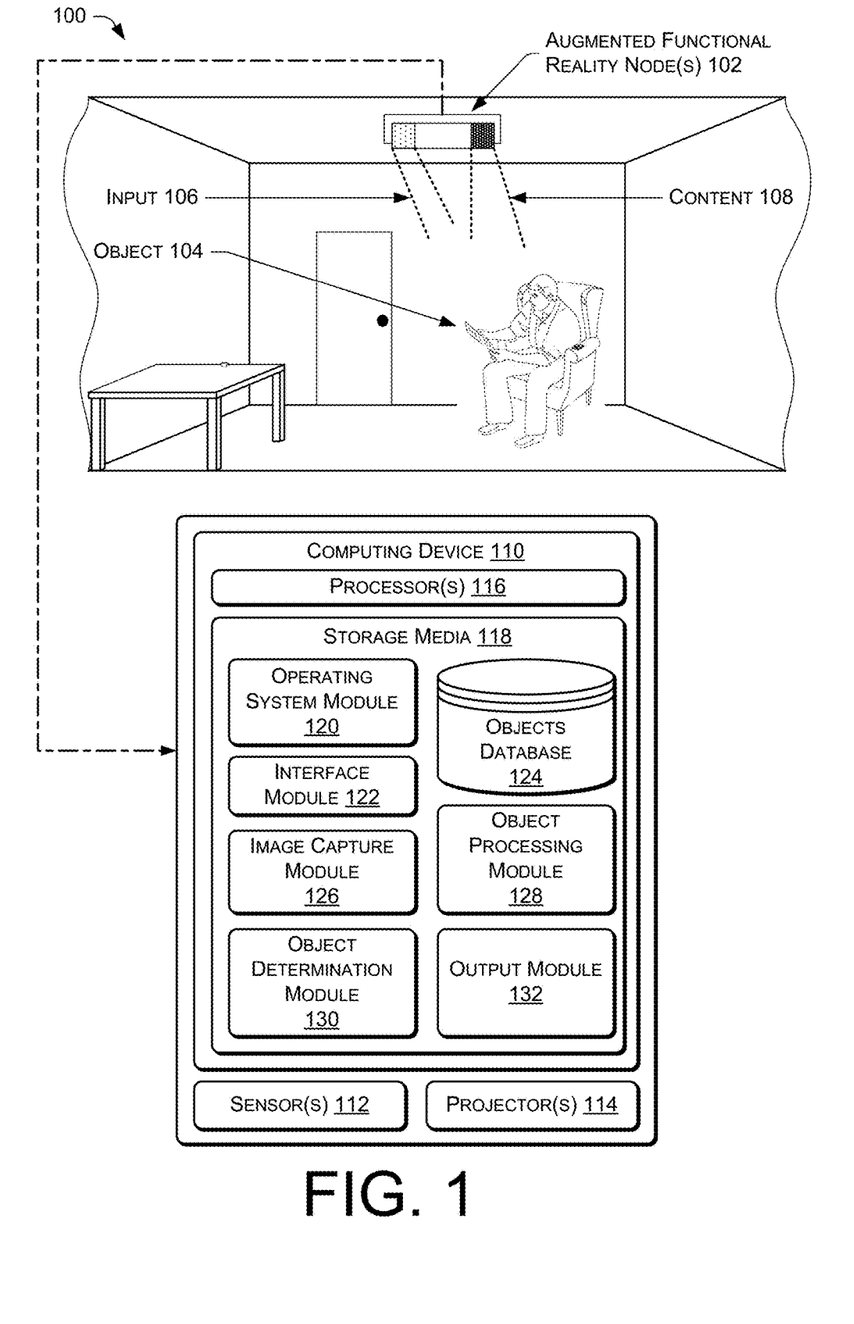
FIG. 1 illustrates an example environment that includes one or more augmented reality functional nodes ("ARFNs") that are configured to identify objects within the environment.

FIG. 1 illustrates an example augmented reality system 100 for determining a location and contour of an object within an environment utilizing a 2D image and a 3D image. In particular, in order to more accurately predict or determine a location, contour, and movement of an object within an environment, a predicted location and contour of an object derived from a 3D image may be mapped onto a corresponding 2D image. Then, the predicted locations of the object corresponding to the 3D image and the 2D image may be processed to determine an amount of disparity or error between the predicted locations. Upon determining that the disparity is below a certain threshold, the system 100 may conclude that the predicted location and contour of the object are in fact accurate. Otherwise, this process may be repeated until the disparity is determined to be below the threshold. Subsequently, the object may be tracked and/or may be used as a display medium onto which content may be projected.

As shown in FIG. 1, the system 100 may includes one or more ARFNs 102 (collectively referred to as "the ARFN 102"), one or more objects 104, various input 106 captured by the ARFN 102, and content 108 that is to be projected by the ARFN 102. For instance, the ARFN 102 may determine a location and contour of the illustrated object (here, a display medium) and may then project the content 108 within the determined contour and at the determined location of the display medium.

Moreover, the ARFN 102 may include a computing device 110, one or more sensor(s) 112, and one or more projector(s) 114. The computing device 110 may include one or more processor(s) 116 and storage media 118, where the storage media 118 may include an operating system module 120, an interface module 122, an objects database 124, an image capture module 126, an object processing module 128, an object determination module 130, and an output module 132.

In various embodiments, the system 100 may illustrate an augmented reality environment that includes an ARFN 102 that is configured to perform the techniques and processes described herein. While the environment 100 illustrates a single ARFN 102, in some instances the environment may include multiple different ARFNs 102 stationed in different locations throughout the environment, and/or in adjacent environments. When active, the ARFN 102 may monitor the environment for objects 104, which may include users, animals, and other physical items (e.g., furniture, an object that may be manipulated by a user, walls, etc.) that may be present within the environment. In addition to receiving input directly from a user, the ARFN 102 may receive input 106 as a result of the monitoring. That is, the ARFN 102 may capture one or more images of the environment, which may allow the ARFN 102 to identify the objects 104 within the environment. Based at least in part on the input 106, the ARFN 102 may project various content 108 onto any surface within the environment, thereby generating an augmented reality environment that may incorporate real-world objects 104 within the environment. The ARFN 102 may also output audible content in some instances.

Each ARFN 102 may include one or more computing devices 110, as well as one or more sensor(s) 112 (e.g., cameras) that, when active, may capture one or more images, video, or audio associated with the environment. In various embodiments, the ARFN 102 may include at least one 2D camera and at least one 3D camera that may capture 2D images and 3D images, respectively. The 2D images may correspond to red, green, blue color model ("RGB") or grayscale images and the 3D images may correspond to one or more depth maps that represent the position or relative distance between objects 104 within the environment. As discussed below, the ARFN 102 may utilize the 2D and 3D images to determine a location and contour of objects 104 within the environment, such as identifying and locating objects 104 that may change positions within the environment. Moreover, as a result of the sensor(s) 112, the ARFN 102 may also recognize and interpret gestures that are made by users within the environment.

In various embodiments, the sensor(s) 112 may include one or more image sensors such as one or more cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure The ARFN 102 may also include one or more projector(s) 114 that, when active, project content onto any surface within the environment 100. The projected content may include electronic books, videos, images, interactive menus, or any other sort of visual content. In various embodiments, upon processing images captured by the sensor(s) 112 (e.g., 2D and 3D cameras), the ARFN 102 may determine a location and contour of an object 104 within the environment. The projector(s) 114 may then recognize gestures of the object (e.g., if the object is a hand), track the object through the environment 100 (e.g., if the object is a user), and/or project content 108 onto the object (e.g., if the object is a display medium) according to the location and contour of the object 104 determined by the ARFN 102.

In some instances, the computing device 110 of the ARFN 102 may reside within a housing of the ARFN 102 or may reside at another location that is operatively connected to the ARFN 102. As shown, the computing device 110 may include one or more processor(s) 116, which may execute one or more modules and/or processes to cause the ARFN 102 to perform a variety of functions, as set forth above and explained in further detail in the following disclosure. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. In some embodiments, the processor(s) 116 may be configured to execute instructions that may be stored in the storage media 118 or in other storage media 118 accessible to the processor(s) 116.

Although not shown, an input/output (I/O) interface, meanwhile, may be configured to couple the computing device 110 to other components of the ARFN 102, such as the sensor(s) 112, the projector(s) 114, other ARFNs 102 (such as in other environments or in the environment 100), other computing devices, network communication devices (such as modems, routers, and wireless transmitters), and so forth. The coupling between the computing device 110 and other devices may be via wire, fiber optic cable, wireless connection, or the like.

The storage media 118 of the computing device 110 may include non-transitory computer-readable storage media ("CRSM"). The CRSM may be any available physical media accessible by a computing device to implement the instructions stored thereon. The CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 110. The storage media 118 may reside within the housing of the ARFN 102, on one or more storage devices accessible on a local network, on cloud storage accessible via a wide area network, or in any other accessible location. The CRSM does not include communication media, such as signals or carrier waves.

The storage media 118 may store several modules, such as instructions, datastores, and so forth that are configured to execute on the processor(s) 116. For instance, the storage media 118 may store an operating system module 120, an interface module 122, an objects database 124, an image capture module 126, an object processing module 128, an object determination module 130, and an output module 132.

The operating system module 120 may be configured to manage hardware and services within and coupled to the computing device 110 for the benefit of other modules. The interface module 122, meanwhile, may be configured to receive and interpret commands received from users within the environment. For instance, the interface module 122 may receive information or characteristics relating to objects 104 that may be present within the environment. More particularly, for a particular object 104, a user may specify its identity, shape, size, contour, color, etc., such that the ARFN 102 may detect and identify this object 104 when it is present within the environment. Such information may then be stored in the objects database 124 for subsequent use, such as knowing the particular contour of a display medium previously used within the environment 100. For instance, the interface module 122 may analyze and parse images captured by one or more cameras to identify objects 104 (e.g., objects 104 manipulated by a user, hand gestures made by users) within the environment, which may be performed by comparing the detected objects 104 to objects 104 that are stored in the objects database 124 and are, therefore, known by the ARFN 102.

The objects database 124 may also maintain information about the state of the computing device 110, the sensor(s) 112, the projector(s) 114, and so forth. For example, and as described in detail below, the ARFN 102 may be configured to pan and tilt for the purpose of allowing sensor(s) 112 and projector(s) 114 to access different projection surfaces in the environment. As such, the system parameters maintained in the objects database 124 may include current pan and tilt settings of the sensor(s) 112 and projector(s) 114, an indication of content that the ARFN 102 is currently projecting or otherwise outputting, and the like.

The image capture module 126 may receive data from the sensor(s) 112, which may be continuously or periodically or continuously monitoring the environment. For example, the image capture module 126 may receive 2D and/or 3D images that are captured by a 2D camera and a 3D camera respectively, and that represent the environment. The 2D and 3D images may also represent the same scene (e.g., room, etc.) within the environment. Utilizing the 2D and 3D images, the ARFN 102 may detect in real-time, or near real-time, the presence of objects 104 within the environment.

Upon obtaining a 2D image and a 3D image of the environment, the object processing module 128 may detect or identify a particular object 104 included within the images. In some embodiments, the object processing module 128 may derive characteristics about the detected object 104, such as its corresponding size, shape, contour, color, and so forth. As stated above, the objects database 124 may store a library of objects or gestures that may be used to detect and interpret the objects 104 or gestures detected in the 2D and 3D images. That is, the characteristics of the detected object 104 may be compared to those stored in the objects database 124 to determine whether a match exists. If so, and based on the parameters of the system 100 that are also stored in the objects database 124, the ARFN 102 may be able to identify the detected object 104.

In certain embodiments, provided that the image capture module 126 has received both a 2D image and a 3D image of the environment (e.g., the same scene of the environment), the object processing module 128 may determine a location of an object 104 included in the 3D image and a corresponding contour of that object 104. The object processing module 128 may then map the object 104 from the 3D image onto a corresponding location in the 2D image, thereby causing the object 104 from the 3D image to at least partially overlap the corresponding object 104 in the 2D image. A predicted location, and a corresponding contour, of the object 104 in the 2D image may then be determined. As a result, the object processing module 128 may predict a location and contour of the same object 104 in both the 2D image and the 3D image.

Moreover, the object determination module 130 may compare the predicted location and contour of the object 104 derived from the 3D image to the predicted location and contour of the object 104 from the 2D image. The object determination module 130 may then determine a difference or disparity between the location and contour of the object 104 from both images. That is, since the 3D object 104 has been mapped onto the 2D image, the 3D object 104 may not completely overlap the location and contour of the object 104 in the 2D image. If this disparity is less than or equal to a predetermined threshold, the object determination module 130 may determine that the location and contour of the object 104 has been accurately obtained. However, if it is determined that the disparity is equal to or greater than the predetermined threshold, the foregoing process may be repeated. That is, the previously predicted location and contour information associated with the object 104 may be utilized to remap the object 104 from the 3D image onto the 2D image.

The output module 132 may be configured to visually or audibly project content onto any surface within the environment. In instances where the object 104 comprises a display medium, the output module 132 may project the content 108 onto the object 104 according to the location and contour information determined by the object determination module 130. The location and contour information may correspond to a set of points (x, y, and z coordinates or points on an x, y, and z axis) that specify a physical location and shape/outline of the object 104.

In various embodiments, the processes and operations described above may be provide wholly or partially by another device, such as a device that is network-coupled to the ARFN 102, such as through the Internet or other networks. Thus, the 2D and 3D images may be provided to the "cloud" (i.e., network-accessible computing resources), which may return an identity, location, and contour of one or more objects 104 within the environment. In the same or alternative embodiments, known object 104 characteristics may be provided via a cloud infrastructure. In some embodiments, a failure to identify a detected object 104 by the ARFN 102 may cause the ARFN 102 to provide the image data to the cloud for cloud-based identification.

Example Augmented Reality Functional Node

Figure 2:
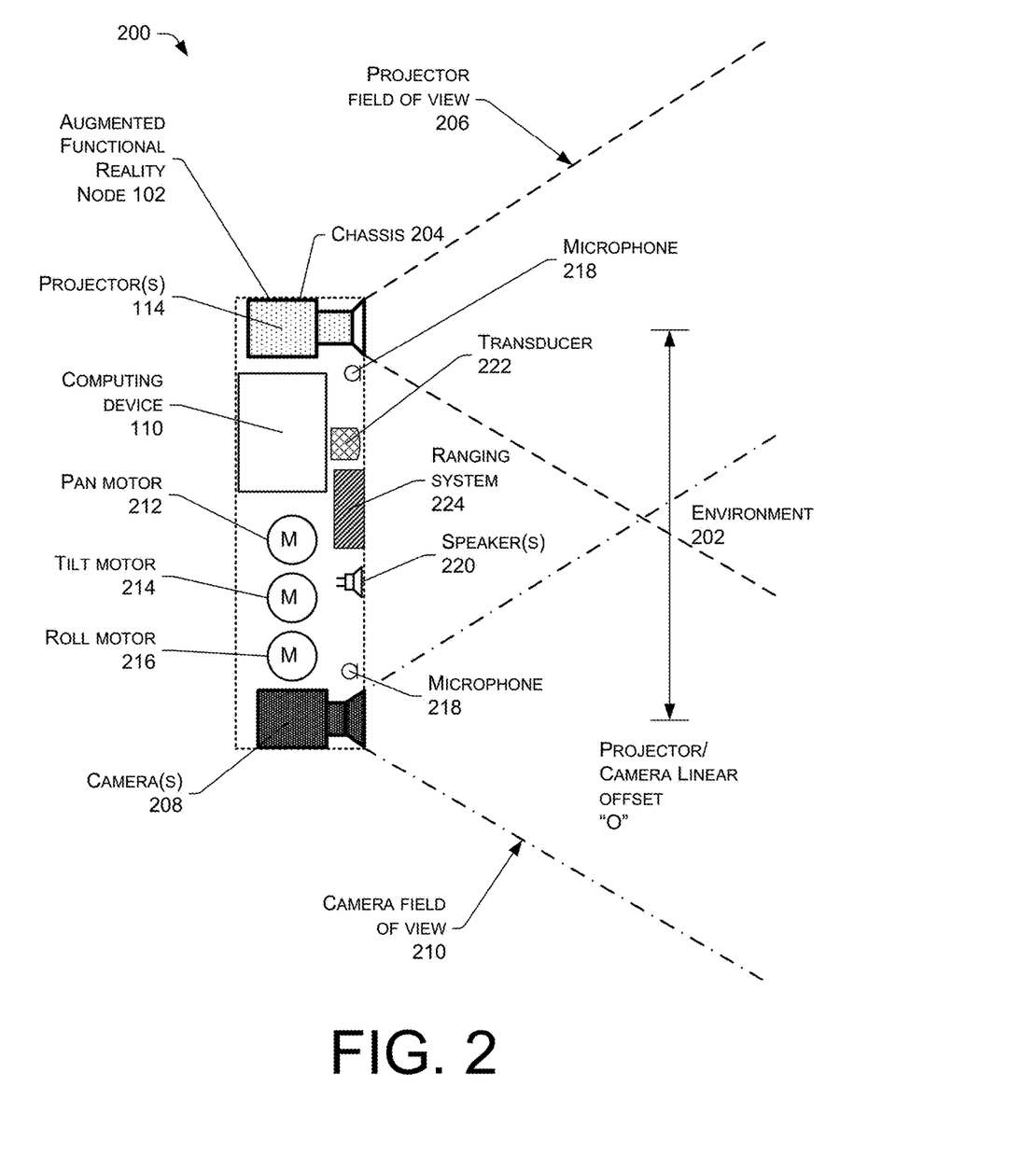
FIG. 2 illustrates an example ARFN that includes a computing device, at least one projector, at least one camera, and other components that are configured to detect a physical location of objects within an environment.

FIG. 2 illustrates a diagram representing an example system 200 for capturing data from an environment (e.g., 2D and 3D images of the environment) and determining a location and contour of objects 104 within the environment. In some embodiments, the system 200 may correspond to the ARFN 102, as described above with respect to FIG. 1. The ARFN 102 may be configured to scan at least a portion of an environment 202 and the objects 104 to detect, identify, and determine a location and contour of the objects 104. The ARFN 102 may also be configured to provide augmented reality output, such as images, video, text, sounds, and so forth.

In some embodiments, a chassis 204 may hold the components of the ARFN 102. One or more projector(s) 114 may be disposed within the chassis 204 and may be configured to generate and project audio, light, and/or images into the environment 202. These images may be visible light images perceptible to a user, visible light images imperceptible to the user, images with non-visible light, or a combination thereof. The projector(s) 114 may be implemented with any number of technologies capable of generating an image and projecting that image onto a surface within the environment 202. Suitable technologies include a digital micromirror device (DMD), liquid crystal on silicon display (LCOS), liquid crystal display, 3LCD, and so forth. The projector(s) 114 also have a corresponding projector field of view 206 which describes a particular solid angle. The projector field of view 206 may vary according to changes in the configuration of the projector(s) 114. For example, the projector field of view 206 may narrow upon application of an optical zoom to the projector(s) 114.

In some implementations, the ARFN 102 may instruct devices that are separate from, but at least partially controllable by, the ARFN 102 to visually or audibly output content. For instance, the ARFN 102 may instruct a television or other display device within the environment 202 to output a particular piece of visual content. Or, the ARFN 102 may instruct stereo speakers within the environment 202 to output certain audible content. In these instances, the projector(s) 114 may project non-visible structured light (or other types of light for sensing objects 104 and/or for sensing movement within the environment 202), while utilizing other output devices within the environment 202 to output requested content, including content associated with one or more conditions that are satisfied. Of course, in other instances the projector(s) 114 may be used instead of, or in addition to, the existing output devices within the environment 202.

One or more camera(s) 208 may also be disposed within the chassis 204. The camera(s) 208 may be configured to image or capture the environment 202 in visible light wavelengths, non-visible light wavelengths, or both, including capturing images in both a 2D and 3D context. The camera(s) 208 may have a corresponding camera field of view 210 that describes a particular solid angle. The camera field of view 210 may vary according to changes in the configuration of the camera(s) 208. For example, an optical zoom of the camera 208 may narrow the camera field of view 210.

In some implementations, multiple camera(s) 208 may be used. For instance, one embodiment of the ARFN 102 may include a 3D, infrared (IR) camera and a 2D red-green-blue (RGB) camera. The 3D, IR camera may be configured to capture information for detecting depths of objects 104 within the environment 202, while the 2D RGB camera may be configured to detect edges of objects 104 by identifying changes in color within the environment 202. In some instances, a single camera 208 may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector(s) 114 and/or the camera(s) 208. For example, in some embodiments, the actuator may comprise a pan motor 212, a tilt motor 214, and so forth. The pan motor 212 may be configured to rotate the chassis 204 in a certain motion, such as a yawing motion. The tilt motor 214, meanwhile, may be configured to change the pitch of the chassis 204. In some instances, the ARFN 102 may additionally or alternatively includes a roll motor 216, which may allow the chassis 204 to move in a rolling motion. By panning, tilting, and/or rolling the chassis 204, different views of the environment 202 may be obtained.

One or more microphones 218 may be disposed within the chassis 204, or elsewhere within the environment 202. These microphones 218 may be used to acquire input from a user, for echolocation, location determination of a sound, or to otherwise aid in the characterization of and receipt of input from the environment 202. For example, a user may make a particular noise, such as a cough, a throat clear, a tap on a wall, or snap of the fingers, which are pre-designated as attention command inputs or as object detection noises. A user may also use voice commands to control various aspects of the ARFN 102. Such audio inputs may be located within the environment 202 using time-of-arrival differences among multiple microphones 218 and used to summon an active zone within the environment 202 or to identify a location of users.

One or more speaker(s) 220 may also be present to provide for audible output, such as a siren, warning noises, animal noises, voices, and other noises including other messages or warnings that may be projected, and thus conveyed, to users. The speaker(s) 220 may be used to provide non-security functions, such as the output from a text-to-speech module or to playback pre-recorded audio.

A transducer 222 may be present within the ARFN 102, or elsewhere within the environment 202, and may be configured to detect and/or generate inaudible signals, such as infrasound or ultrasound. These inaudible signals may be used to provide for signaling between accessory devices and the ARFN 102.

The ARFN 102 may also include a ranging system 224. The ranging system 224 may be configured to provide distance information from the ARFN 102 to a scanned object 104 within the environment 202. The ranging system 224 may comprise radar, light detection and ranging (LIDAR), ultrasonic ranging, stereoscopic ranging, and so forth. In some embodiments, the transducer 222, the microphones 218, the speaker(s) 220, or a combination thereof, may be configured to use echolocation or echo-ranging to determine distance and spatial characteristics of an object 104.

As shown, the computing device 110 may be shown within the chassis 204. However, in other embodiments, all or a portion of the computing device 110 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 that is accessible via a local area network, cloud resources accessible via a wide area network connection, or a combination thereof.

Also shown in this illustration is a projector/camera linear offset designated "O". This may represent a linear distance between the projector(s) 114 and the camera(s) 208. Placement of the projector(s) 114 and the camera(s) 208 at distance "O" from one another may aid in the recovery of structured or other light data from the environment 202. The known projector/camera linear offset "O" may also be used to calculate distances, dimensioning, and otherwise aid in the characterization of objects 104 within the environment 202. In other embodiments, the relative angle and size of the projector field of view 206 and camera field of view 210 may vary. Also, the angle of the projector(s) 114 and the camera(s) 208 relative to the chassis 204 may vary.

In various embodiments, the components of the ARFN 102 may be distributed in one or more locations within the environment 202. As mentioned above, microphones 218 and speaker(s) 220 may be distributed throughout the environment 202. The projector(s) 114 and the camera(s) 208 may also be located in separate chasses 204. The ARFN 102 may also include discrete portable signaling devices used by users 104 to issue command attention inputs. For example, these may be acoustic clickers (audible or ultrasonic), electronic signaling devices such as infrared emitters, radio transmitters, and so forth.

The ARFN 102 illustrated in FIG. 2 is shown with various sensors, but other sensors may be located either within, or external to, the chassis 204. The sensors may include, in various embodiments, cameras 208 (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Three-Dimensional Analysis Using Structured Light Patterns

Figure 3:
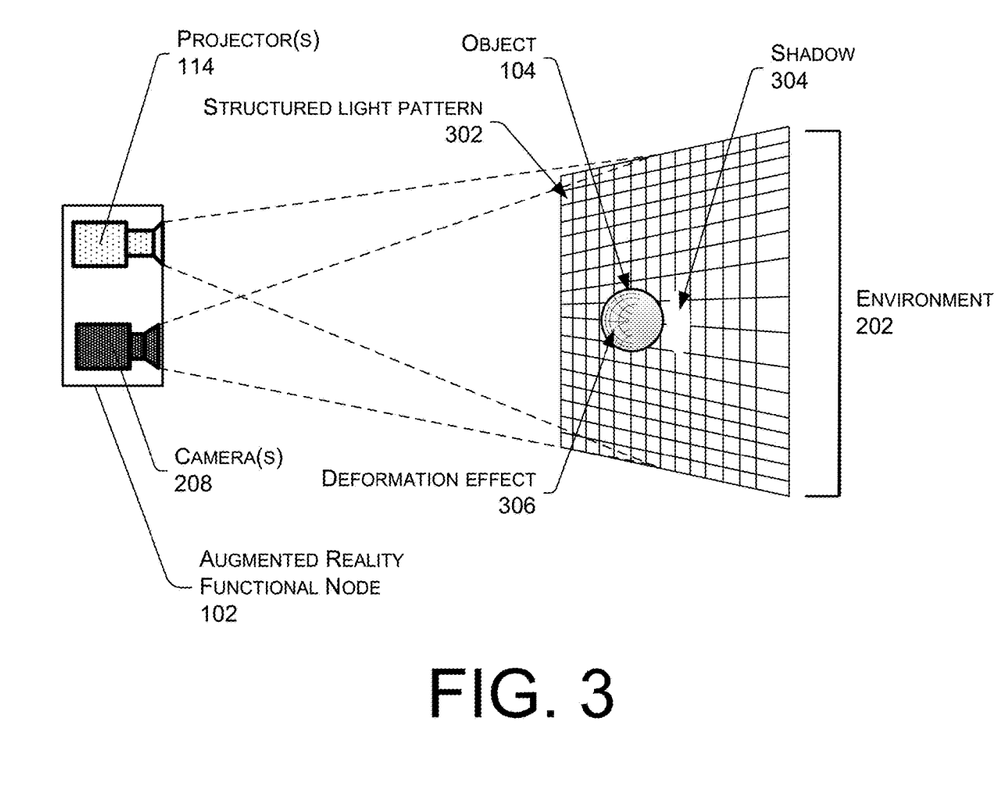
FIG. 3 illustrates an example diagram of an ARFN using structured light to identify surfaces, objects, and user interactions within an environment.

FIG. 3 illustrates an example diagram of the ARFN 102 using structured light to identify 3D information regarding objects, such as hands of a user or objects associated with a user, within an environment. For instance, the structured light may be used to determine a location and corresponding contour of an object within an environment. However, while the structured light techniques described herein provide one example for obtaining 3D information regarding these objects, it is to be appreciated that 3D information may be determined in other manners in other embodiments.

In the instant illustration, one or more projector(s) 114 may project a structured light pattern 302 onto an environment 202. In some implementations a sequence of different structured light patterns 302 may be used. In other implementations, other devices such as general room lighting may generate structured light patterns 302. A light fixture, bulb, and so forth may be configured such that emitted light contains one or more modulated structured light patterns 302. For example, two structured light patterns 302 may be presented, each at a different non-visible wavelength within the structure of an incandescent bulb.

One or more camera(s) 208 that may be used to detect the structured light may also be incorporated into bulbs or assemblies suitable for installation in existing light fixtures. These assemblies may be configured to communicate with the computing device 110 wirelessly or via transmission of a signal via the household electrical wiring. In some implementations, the assembly may provide pre-processing of input prior to sending data along to the computing device 110.

This structured light pattern 302 may be in wavelengths that are visible to the user, non-visible to the user, or a combination thereof. The structured light pattern 302 is shown in this example as a grid for ease of illustration and not as a limitation. In other implementations, other patterns, such as bars, dots, pseudorandom noise, and so forth may be used. Pseudorandom Noise (PN) patterns may be useful as structured light patterns 302 because a particular point within the PN pattern may be specifically identified. A PN function may be deterministic in that, given a specific set of variables, a particular output may be defined. This deterministic behavior may allow for specific identification and placement of a point or block of pixels within the PN pattern. In some implementations, a plurality of structured light patterns 302 may be used to image the environment 202. These may include different PN patterns, geometric shapes, and so forth.

For illustrative purposes, an object 104 is shown positioned between the projector(s) 114 and a wall in the environment 202. Although a sphere is illustrated as the object 104 in FIG. 3, any shape or size of object 104 is contemplated herein. A shadow 304 from the object 104 may appear on the wall. Inspection of the object 104 may show a deformation or distortion effect 306 of the structured light pattern 302 as it interacts with the curved surface of the object 104.

In some embodiments, other effects, such as dispersion of the structured light pattern 302, may be used to provide information on the topology of the environment 202. Where the projector(s) 114 and camera(s) 208 may have differing fields of view, such as shown in FIG. 2, the dispersion or change in the "density" of the structured light pattern 302 may be used to determine the depth of field.

The camera(s) 208 may detect the interaction of the structured light pattern 302 with objects 104 within the environment 202. For example, the deformation effect 306 on the object 104 may be detected by the camera(s) 208. The camera(s) 208 may similarly identify deformation effects 306 on users within the environment 202 and may utilize this information to identify user gestures and the trajectories of these gestures. That is, the camera(s) 208 may identify, via deformation in the structured light, a location of a selection tool (e.g., a user's finger) as this location changes over time. The ARFN 102 may then use these locations tracked over time to identify a trajectory of the gesture or object 104.

Determining an Object Contour

Figure 4:
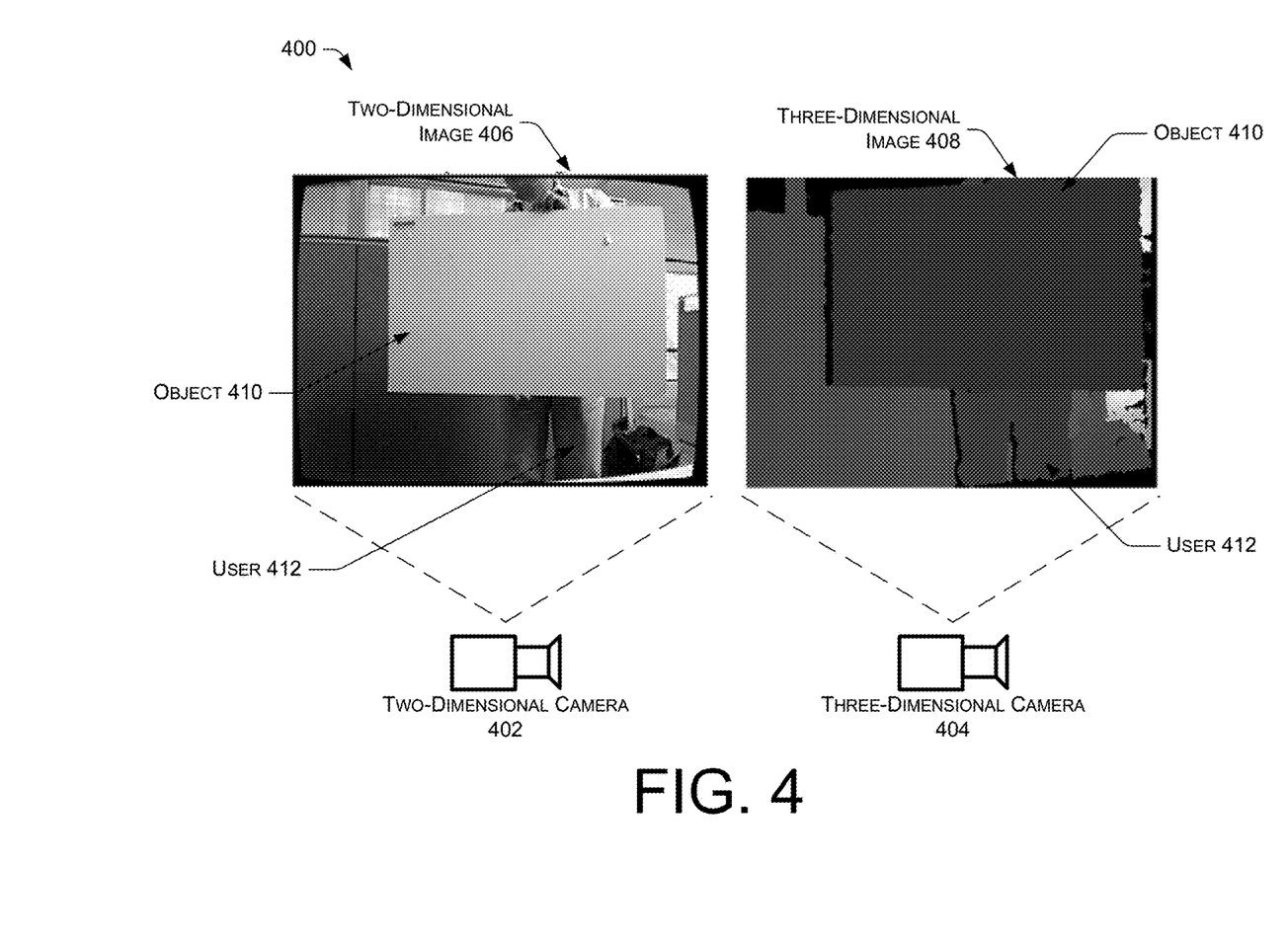
FIG. 4 illustrates an example diagram of detecting at least one object utilizing a two-dimensional (2D) image and a three-dimensional (3D) image.

FIG. 4 illustrates an example system 400 for capturing images that may used to determine a location and contour of one or more objects within an environment. As shown, the system 400 may include a 2D camera 402 and a 3D camera 404. The 2D camera may capture a 2D image 406 while the 3D camera may capture a 3D image 408. As illustrated, because the cameras capture the respective images of the same scene, both the 2D image and the 3D image include an object 410 that is held by a user 412.

As stated above, the location and 3D boundary of an object 410 may be determined based at least in part on a 3D image 408 captured by a 3D camera 404. A 3D boundary of an object 410 may be defined as the boundary of a continuous surface representing the object 410 in a 3D image 408. The boundary may be represented as a contour in general. However, noise and/or interference associated with the 3D image 408 may cause the contour of the object 410 determined from the 3D image to be incomplete and, therefore, inaccurate. That is, the outline or boundary of the object 410 may appear to be broken or incomplete when derived solely from the 3D image 408. As a result, an estimated location of the object 410 may be predicted, but it may be difficult to accurately determine the exact location of the object 410 with respect to the surrounding environment. As shown, the object 410 may correspond to a white board or piece of paper being held by the user 412 within the environment. Although the outline of the object 410 appears to be defined in the 2D image 406, it is difficult to differentiate between the object 410 and the user 412 in the 3D image 408. That is, it is difficult to determine the location points corresponding to where the edge of the object 410 ends and the user 412 begins. In order to accurately determine the location and contour of the object 410, a 2D image 406 captured by the 2D camera 402 may be utilized in conjunction with the 3D image 408.

In certain embodiments, the system 400 may represent the ARFN 102, meaning that the 2D camera 402 and the 3D camera 404 may be part of, or at least are associated with, the ARFN 102. As a result, the ARFN 102 may be configured to capture a 2D image 406 using the 2D camera 402 and to capture a 3D image 408 using the 3D camera 404. The 2D image 406 and the 3D image 408 may both reflect a particular view of the same environment and, therefore, the object 410 may appear in both the 2D image 406 and the 3D image 408. As set forth below with respect to FIG. 5, utilizing a combination of the 2D image 406 and the 3D image 408 may enable the ARFN 102 to determine a position and contour of the object 410 within the environment.

In various embodiments, the frame rates corresponding to the 2D camera 402 and the 3D camera 404 may be set or adjusted such that the 2D image 406 and the 3D image 408 represent the environment at the same time. That is, it may be desirable to have the corresponding frame rates be equal so that the 2D camera 402 and the 3D camera 404 are capturing the object 410 at the same time. Otherwise, the object 410 included in both the 2D image 406 and the 3D image 408 may be in different locations when the object is moving within the environment, which may cause difficulties in accurately determining the position of the object 410 at a particular time.

Moreover, the physical locations of the 2D camera 402, the 3D camera 404 and the projector(s) 114 may be maintained. As a result, the system 400 may be aware of the spatial relationships and orientations with respect to the foregoing components. Provided that the physical locations are defined, a calibration between the 2D camera 402, the 3D camera 404 and the projector(s) 114 may be performed so that an accurate location and contour of the object 410 may be determined. In addition, the location of the display region associated with the environment may also be well defined and/or obtained so that the system 400 may be aware of objects 410 that are likely to be included within the environment.

Example Processes

Figure 5:
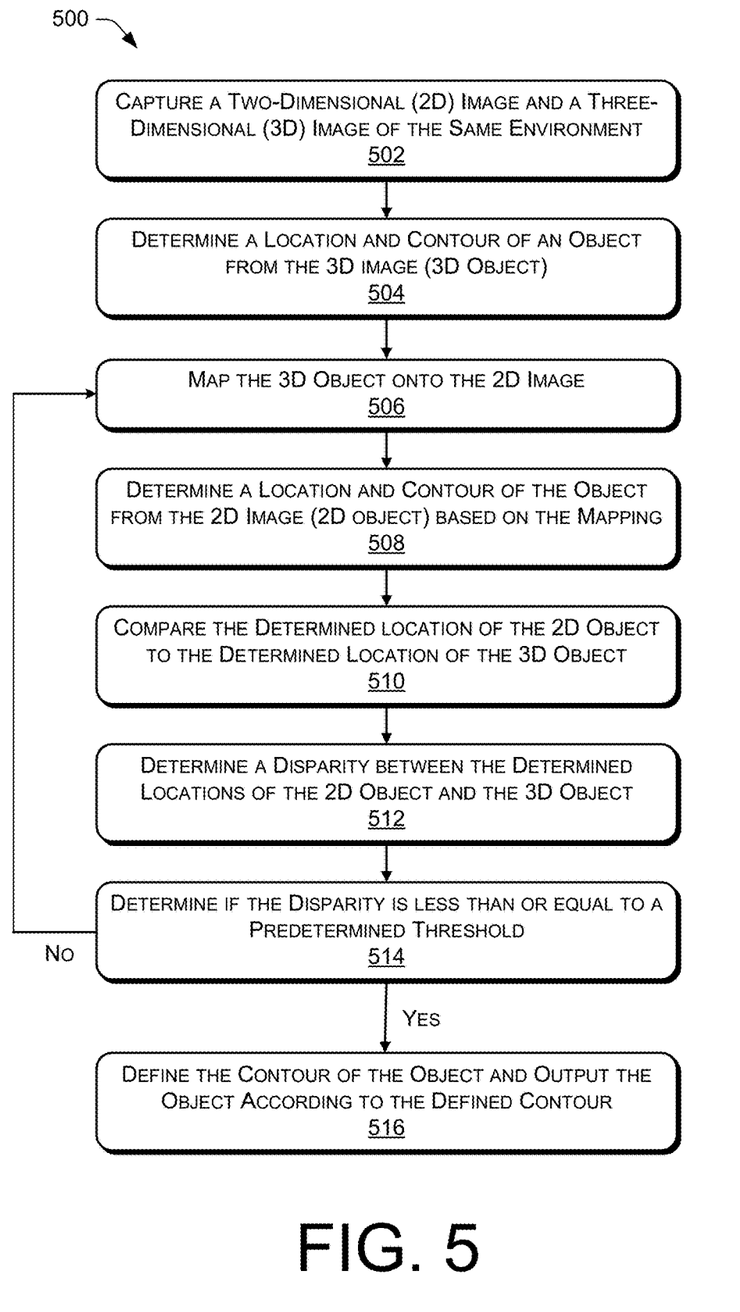
FIG. 5 illustrates an example flow diagram of an ARFN detecting at least one object utilizing a 2D image and a 3D image.

FIG. 5 describes an example process 500 of determining the location and contour of objects within an environment. This process is described in the context of the environment of FIGS. 1-4 but is not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

The process 500 includes the block 502 illustrates capturing a 2D image and a 3D image of the same environment. In various embodiments, the ARFN, as described with respect to FIGS. 1-4, may monitor an environment using both a 2D camera and a 3D camera. Utilizing the 2D camera and the 3D camera, the ARFN may capture a 2D image and a 3D image, respectively. In addition, a transformation matrix M that defines a transformation between a coordinate system associated with the 3D camera and a coordinate system associated with the 2D camera is available as a result from a system calibration process. The transformation between the corresponding 3D image and the corresponding 2D image can be developed based on M and intrinsic parameters from both the 2D camera and the 3D camera. The intrinsic parameters may also be available from the system calibration process.

Block 504 illustrates determining a first location and a first contour of an object from the 3D image (3D object). More particularly, the ARFN may determine a set of points that correspond to a location of an object that is within the environment, as represented by the 3D image. That is, the physical location of the object and the contour of the object (e.g., outline, boundary, or border), which may be represented by a set of 3D points, may be determined. In some embodiments, known objects that are stored in the objects database may be referenced to determine the identity of the object located in the 3D image. If the pixels associated with the detected object correspond to a known object, a plane corresponding to the detected object may be determined. That is, since the ARFN is aware of objects that might be detected within the environment, including the dimensions thereof, the ARFN may determine that a particular object has been detected if the dimensions or characteristics of the detected object match those of an object stored in the objects database.

Block 506 illustrates mapping the 3D object (e.g., the set of points representing the first location and first contour)

onto the 2D image. More particularly, the object detected in the 3D image, including the location and contour associated therewith, may be mapped onto the 2D image. In some embodiments, since the 3D image and the 2D image represent the same environment, the 3D object may be first projected into a 2D space with respect to the coordinate system associated with the 3D camera, and then mapped onto a location of the 2D image that corresponds to a location where the object is expected to be. As a result, the object from the 3D image and the object from the 2D image may at least partly overlap one another. Provided that the 3D image and the 2D image are not identical, the ARFN may offset or otherwise calibrate the images to compensate for any differences between the two images.

Block 508 illustrates determining a set of points representing a second location and a second contour of the object from the 2D image (2D object) based on the mapping. In particular, the 3D object that is mapped onto the 2D image may be processed in order to identify the object in the 2D image. In addition, the location of the 2D object and a contour of the 2D object may also be predicted or determined.

Block 510 illustrates comparing the determined first location and first contour of the 3D object to the determined second location and second contour of the 3D object. That is, the set of points depicting the object in the 3D image may be compared to the set of points depicting the object in the 2D image. Such a comparison may be made in order to determine whether the object is detected in approximately the same location for both the 2D image and the 3D image.

Block 512 illustrates determining a disparity between the determined locations (i.e., set of points) of the 2D object and the 3D object. That is, based at least in part on the comparison between the location and contour of the 2D object and the 3D object, the disparity or difference between these objects may be determined. The disparity may represent an amount of error between the predicted locations of the 2D object associated with the 2D image and the 3D object associated with the 3D image.

Block 514 illustrates determining if the disparity is less than or equal to a predetermined threshold. Moreover, if the disparity is less than or equal to a predetermined threshold, it may be determined that the location and contour of the object within the environment has been accurately obtained. That is, a final location and contour may be designated when the determined location and contour of the objects in the 3D image and the 2D image are approximately the same. Assuming that the disparity is less than or equal to the predetermined threshold, the process may proceed to block 516, which is represented by "Yes."

However, if it is determined that the disparity is equal to or greater than the predetermined threshold ("No"), the 3D object may be remapped to onto the 2D image in order to obtain a more accurate location and contour of the object in the 2D image. In other words, since there may be a significant difference between the predicted location and contour of the 2D object and 3D object, as determined from the 2D image and the 3D image, respectively, portions of the foregoing process may be repeated until the disparity between the 2D object and 3D object is equal to or less than the predetermined threshold.

In various embodiments, if the disparity is equal to or greater than the predetermined threshold, information previously determined or predicted regarding the object may be utilized. For instance, the location of the object within the environment that was previously determined and the shape/contour of the object that was initially determined may be utilized to remap the 3D object onto the 2D image. Although the exact location and contour that was previously predicted may not correspond to the actual location and contour of the object within the environment, this information may be helpful in the remapping process.

Block 516 illustrates defining a final location and/or a final contour of the object. As described above, when it is determined that the disparity is less than or equal to the predetermined threshold, the ARFN may determined that the location and contour of the object within the environment has been accurately obtained. As a result, the location and contour (e.g., outline, boundary, etc.) of the object may be defined. This final location and/or contour may comprise the first location and first contour from the 3D image, the second location and second contour from the 2D image, or some location and/or contour based on this data. That is, the final location and/or contour may be based in whole or in part on the set of points from the 3D image and/or the set of points from the 2D image. After designating a final location and contour, the object may be tracked through the environment and/or may be used as a display medium according to the defined final location and contour of the object.

As described above, upon determining or predicting a location and contour of an object utilizing a 3D image, a 2D image may be utilized to more accurately determine the location and contour of the object. That is, since noise and/or interference associated with the 3D image may cause the contour of the object to appear inaccurate or incomplete, and because the 2D image may not sufficiently represent the spatial relationships between objects within the environment, the 2D image may be utilized to further define or confirm the location and contour of the object. Consequently, a combination of a 2D image and a 3D image may be utilized to determine the location and contour of an object (e.g., a display medium, a user, a hand, a fingertip, a hand gesture, etc.) within an environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
one or more sensors to capture a first image of an environment and a second image of the environment, the first image depicting a depth of one or more objects within the environment;
memory;
one or more processors; and
one or more computer-executable instructions maintained in the memory and executable by the one or more processors to:
determine, from the first image, a set of points that corresponds to an object depicted in the first image;
determine, based at least partly on the set of points, a portion of the second image that depicts the object, the portion being a subset of an entirety of the second image and including a boundary that surrounds the object;
determine pixel data associated with the portion of the second image; and determine, based at least partly on the pixel data, one or more characteristics associated with the object.

2. The system as recited in claim 1, further comprising an object database that stores one or more second characteristics associated with a second object, and wherein the one or more computer-executable instructions are further executable by the one or more processors to identify the object based at least partly on the one or more characteristics and the one or more second characteristics.

3. The system as recited in claim 1, wherein determining the one or more characteristics associated with the object comprises determining at least one of a boundary of the object, a size of the object, a shape of the object, a location of the object, or a color of at least a second portion of the object.

4. The system as recited in claim 1, wherein the first image is a three-dimensional (3D) image and the second image is a two-dimensional (2D) image, and wherein the one or more sensors include a 3D camera to capture the 3D image and a 2D camera to capture the 2D image.

5. The system as recited in claim 1, wherein the set of points represents a first contour of the object from the first image and the one or more characteristics represent a second contour of the object from the second image, the second contour corresponding to the first contour.

6. The system as recited in claim 1, wherein the one or more computer-executable instructions are further executable by the one or more processors to:
   identify a second set of points within the portion of the second image; and
   determine that the second set of points corresponds to the set of points.

7. The system as recited in claim 1, further comprising a projector, and wherein the one or more computer-executable instructions are further executable by the one or more processors to:
   identify a second set of points within the portion of the second image;
   determine, based at least partly on the second set of points, a location of the object within the environment; and
   cause the projector to project content onto the object based at least partly on the location of the object.

8. The system as recited in claim 7, wherein the one or more computer-executable instructions are further executable by the one or more processors to determine the location of the object based at least partly on a comparison of the set of points and a second set of points that corresponds to the object in the second image.

9. A method comprising:
   capturing, by a first camera, a first image that depicts a depth of one or more objects within an environment;
   capturing, by a second camera, a second image;
   determining, from the first image, a set of points that corresponds to an object depicted in the first image;
   determining, based at least partly on the set of points, that a boundary of the object depicted in the first image is incomplete;
   determining, based at least partly on the set of points and the boundary of the object depicted in the first image being incomplete, a second set of points that corresponds to the object depicted in the second image; and
   determining, based at least partly on the second set of points, one or more characteristics associated with the object.

10. The method as recited in claim 9, wherein determining the one or more characteristics associated with the object comprises determining at least one of the boundary of the object, a shape of the object, a size of the object, a location of the object within the environment, or a color of at least a portion of the object.

11. The method as recited in claim 9, further comprising:
   determining one or more second characteristics that are associated with a second object and that are stored in an objects database; and
   determining an identity of the object based at least partly on the one or more characteristics and the one or more second characteristics.

12. The method as recited in claim 9, wherein determining the second set of points comprises identifying, based at least partly on the set of points, a portion of the second image that depicts the object.

13. The method as recited in claim 9, further comprising determining an identity of the object based at least partly on the one or more characteristics.

14. The method as recited in claim 9, further comprising determining that the one or more characteristics include at least one of the boundary of the object, a shape of the object, a size of the object, a location of the object within the environment, or a color of at least a portion of the object.

15. The method as recited in claim 9, further comprising:
   generating, based at least partly on the first image, a depth map that represents a position and relative distance between the one or more objects within the environment; and
   generating, based at least partly on the second image, an RGB image or a greyscale image.

16. The method as recited in claim 9, further comprising determining a first frame rate associated with the first camera and a second frame rate associated with the second camera that cause the first image and the second image to be captured at a same time.

17. A method comprising:
   determining, from a first image that depicts a depth of one or more objects within an environment, a set of points that corresponds to an object depicted in the first image;
   determining, based at least partly on the set of points, a portion of the second image that includes a second set of points that corresponds to the object depicted in the second image, the portion being a subset of an entirety of the second image and including a boundary that surrounds the object;
   determining, based at least partly on the second set of points, one or more characteristics associated with the object; and
   determining, based at least partly on the one or more characteristics, an identity of the object.

18. The method as recited in claim 17, wherein determining the identity of the object comprises:
   determining, from an objects database, one or more second characteristics associated with a second object and one or more third characteristics associated with a third object; and
   determining that the one or more characteristics match at least one of the one or more second characteristics or the one or more third characteristics.

19. The method as recited in claim 17, wherein determining the one or more characteristics associated with the object comprises determining at least one of a boundary of the object, a shape of the object, a size of the object, a location of the object within the environment, or a color of at least a portion of the object.

20. The method as recited in claim 17, further comprising:
determining, based at least partly on the second set of points, a location of the object within the environment; and
causing a projector to project content onto the object based at least partly on the location of the object.

* * * * *